United States Patent [19]
Hall

[11] 3,978,952
[45] Sept. 7, 1976

[54] FLUID COUPLING

[75] Inventor: Jeffrey Hall, Huddersfield, England

[73] Assignee: Holset Engineering Company Limited, England

[22] Filed: Oct. 30, 1974

[21] Appl. No.: 519,108

[30] Foreign Application Priority Data
Nov. 15, 1973 United Kingdom............. 53014/73

[52] U.S. Cl. ............................. 192/58 B; 64/26; 34/DIG. 3
[51] Int. Cl.² ......................................... F16D 31/00
[58] Field of Search ........... 192/58 B, 58 A; 64/26; 34/DIG. 3

[56] References Cited
UNITED STATES PATENTS

| | | | |
|---|---|---|---|
| 3,007,560 | 11/1961 | Weir .............................. | 192/58 B |
| 3,373,633 | 3/1968 | Desmond et al. ................ | 192/58 B |
| 3,463,282 | 8/1969 | Fujita et al. ..................... | 192/58 B |
| 3,696,899 | 10/1972 | Kongelka ......................... | 192/58 B |

*Primary Examiner*—Samuel Scott
*Assistant Examiner*—Randall Heald
*Attorney, Agent, or Firm*—Diller, Brown, Ramik & Wight

[57] ABSTRACT

The present invention relates to a viscous shear coupling (e.g. for use as a fan drive comprising an annular driving member, usually in the form of a disc having a hub portion for mounting on a driving shaft, a driven member having an internal annular chamber receiving said annular driving member, with facial planar and circumferential surfaces of said chamber and opposing facial planar and circumferential surfaces of said driving member at least in part being in close-spaced relationship, said driven member being axially and radially located for rotation relative to said driving member, viscous coupling fluid in said chamber, and a 0.0005 to 0.0015 inch thick layer of non-metallic anti-friction material on at least those parts of said facial planar and circumferential surfaces of said annular chamber which are in close spaced relationship, thereby forming journal and thrust bearing means for the relative rotation of the driving member and the driven member.

9 Claims, 3 Drawing Figures

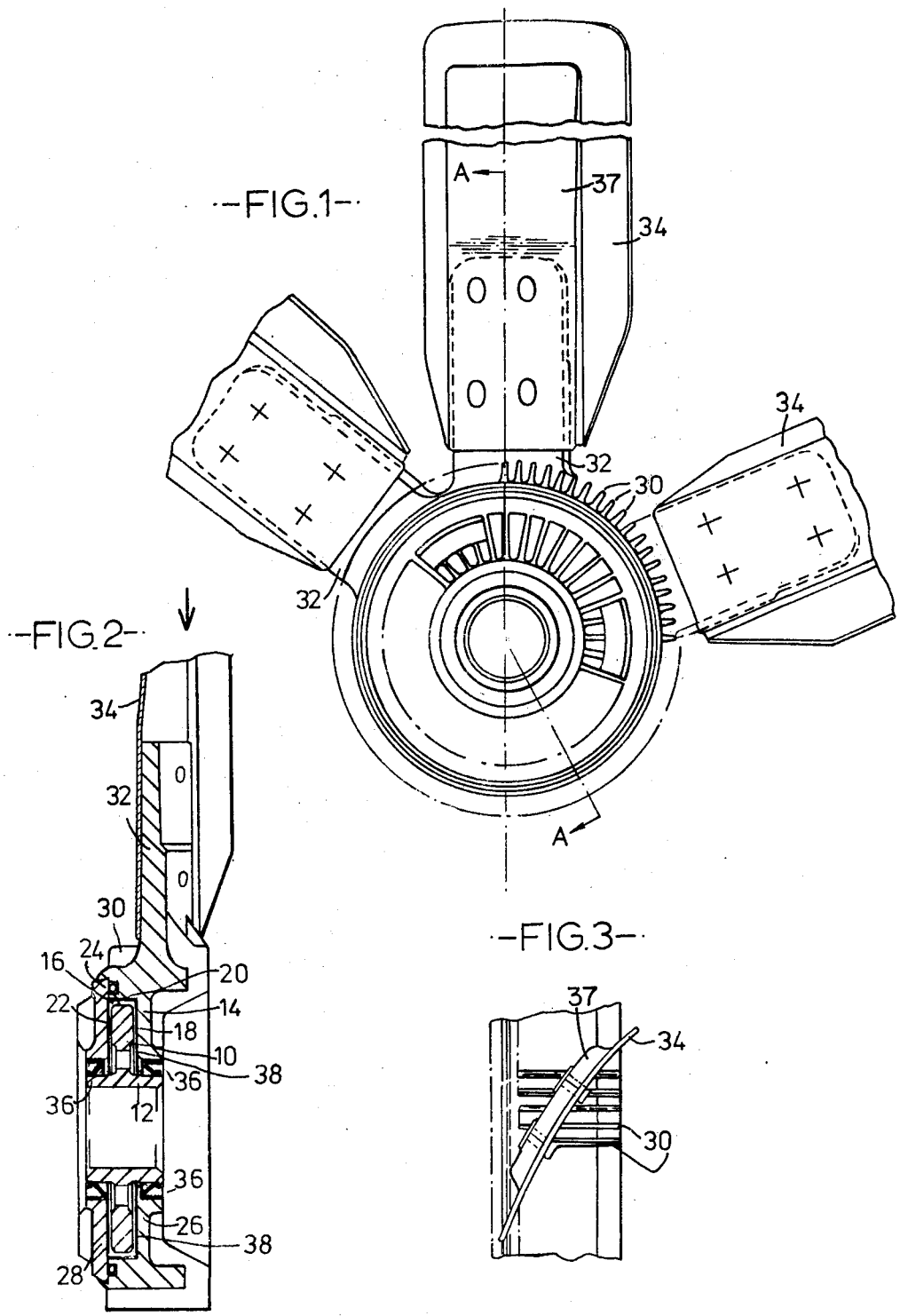

FLUID COUPLING

The present invention concerns viscous shear fluid couplings e.g. for driving the cooling fan of a motor vehicle and more particularly relates to the type of viscous shear coupling in which an outer driven member closely surrounds an inner driving member with a viscous fluid in the space between the driven and driving members to establish a viscous shear driving relation between the two members.

In order to prevent metal to metal contact between the bearing surfaces of the two members under adverse operating conditions, for instance as may occur at start up, it has been found necessary to interpose non-metallic bearing surfaces between the relatively rotatable surfaces of the two members.

The materials used in prior art construction for such bearing surfaces have been selected from sheet forms of granulated cork or asbestos fibre based materials having a thickness in the order of 0.020 to 0.030 inch, and in the prior art construction the non-metallic material has been bonded to the driving or inner member of the coupling. This arrangement ensures optimum cooling conditions for the viscous fluid but tends to maintain the non-metallic bearing material surface temperature at the same level as that of the fluid.

The problem which exists with such couplings is concerned with the fact that the bearing materials used are incapable of operating at temperatures as high as those of the viscous fluid for the same period of time. In consequence if such a coupling is operated at the maximum temperature that gives a satisfactory service life with respect to the fluid premature failure of the bearing materials will occur. Transfer of such bearing materials to the driven or outer member of the coupling increases the fluid temperature under the same operating conditions and again results in reduced service life.

It has now been found that a 0.0005 to 0.0015 inch thick layer of a non-metallic anti-friction material applied to at least those parts of the driving member which act as fluid shear surfaces provides suitable bearing surfaces.

The present invention therefore provides a viscous shear coupling comprising an annular driving member, usually in the form of a disc having a hub portion for mounting on a driving shaft, a driven member having an internal annular chamber receiving said annular driving member, with facial planar and circumferential surfaces of said chamber and opposing facial planar and circumferential surfaces of said driving member at least in part being in close-spaced relationship, said driven member being axially and radially located for rotation relative to said driving member, viscous coupling fluid in said chamber, and a 0.0005 to 0.0015 inch thick layer of non-metallic anti-friction material on at least those parts of said facial planar and circumferential surfaces of said annular chamber which are in close spaced relationship forming journal and thrust bearing means for the relative rotation of the driving member and the driven member.

Preferably the driving member is made of metal (preferably cast iron) and the driven member is made of a metal which is heat dissipating and lighter than the metal of the driving member. A preferred metal for the driven member is aluminium, preferably of die-casting quality.

Anti-friction surface coatings are now available as spray coatings and can be applied as thin films in the order of 0.0005 to 0.0015 inch thick. Such coatings are available in a variety of materials but the preferred coatings for use in viscous shear couplings of the present invention are those of polytetrafluoroethylene (p.t.f.e.) or p.t.f.e. in combination with other synthetic resins that give improved adhesion and which can be cured in situ at temperatures lower than the sintering temperature of pure p.t.f.e. One preferred such material is available under the trade name of "Xylan".

The temperatures at which such coatings are capable of operation in viscous shear couplings of this type are found to be at least as high as that of the silicone fluids currently used as the viscous shear fluid. The use of such coatings thus enables the couplings to be operated at temperatures as high as the temperatures at which the viscous shear fluid may be operated without loss of service life. Because such coatings are thin in comparison to previously used materials they offer negligible obstruction to the flow of heat and thus have little effect on the operating temperature of the viscous shear fluid.

Similar bearing facings to those on the driven member may, if desired, also be present on the facial planar and/or circumferential surfaces of the driving member.

In operation such couplings generate a considerable amount of heat in the shear spaces which has to be dissipated to the surrounding atmosphere, for this purpose it is preferable that cooling fins are provided on the outer surface of the driven member.

Where the coupling is used in connection with a cooling fan, blades or spider arms will be attached to the driven member. In order to increase the cooling area of the driven member it is preferable that the fan spider arms to which the blade are attached, form an integral part of the driven member. The effective cooling area may also be increased still further by attaching aluminium fan blades directly to the fan spider arms with a substantial area of contact between the fan blades and fan spider arms.

The use in the coupling of the invention of a layer of a non metallic anti-friction material on the internal surfaces of the driven member in addition to providing an excellent bearing material results in certain manufacturing and technical advantages. To assist in dissipating the heat generated during operation of the coupling the driven member is preferably made of aluminium and preferably die-cast aluminium to enable the preferred complex finned external shape to be produceable at minimum cost. The use of aluminium however normally leads to difficulties with the internal bearing surfaces of the driven member. They are subject to galling and scuffing under the operating conditions that necessitate the inclusion of nonmetallic bearing surfaces. In previous couplings it has been difficult to achieve a satisfactory surface finish on the aluminium bearing surfaces by normal machining techniques. The best finish normally achievable being in the order to 40 to 50$\mu$ ". Coating the aluminium surfaces with the thin coating materials of the present invention now eliminates the necessity of any special and costly operations required to achieve good finishes on the aluminium and the surfaces are acceptable with finishes produced by normal machining methods up to typically 100 $\mu$". The surface finish of the driving member bearing surfaces are, on the other hand, relatively easy to produce with surface finishes down to 25 $\mu$" and below by normal and relatively low cost grinding operations. A superior bearing is thus more easily and cheaply produced.

The invention will now be further described by way of example with reference to the accompanying drawings, in which:-

FIG. 1 is a front view of a coupling in accordance with the invention,

FIG. 2 is a section along line A—A of FIG. 1, and

FIG. 3 is a view in the direction of the arrow shown in FIG. 2.

Referring to the drawings the coupling shown comprises a cast iron driving member 10 coaxially mounted within a driven outer member 14 for rotation relative thereto. The driving member 10 includes a hub portion 12 for mounting on a drive shaft (not shown). The driven member 14 which is made of aluminium of die casting quality defines a chamber 16 having facial planar surfaces 18 and a circumferential surface 20 in close-spaced relationship with facial planar surfaces 22 and circumferential surface 24 respectively of the driving member 10. To enable the driving member 10 to be inserted in the driven member 14, the driven member 14 comprises two parts 26, 28. The driven member is finned at 30 to assist heat dissipation and the part 26 of the driven member 14 includes integral fan spider arms 32, which also assist in the dissipation of heat. Attached to each spider arm is a fan blade 34 which includes a dished portion 37 to strengthen the blade. The surfaces 18 and 20 of the chamber 16 are coated with a 0.0005 to 0.0015 inch thick layer 38 of a polytetrafluoroethylene resin combination e.g. Xylan, the layer having been applied by a spray-coating process. A viscous coupling fluid is contained in the chamber, rotary shaft seals 36 are interposed between the hub portion 12 of the driving member 10, and the driven member 14.

In operation the driving member 10 which is attached to a drive shaft not shown, is rotated and this in turn rotates the driven member 14 through shear action. There may however be a considerable degree of slip between the two members thereby generating heat. The operation of the coupling is similar in all respects to the operation of prior art couplings having cork, or the like, bearings on the driving member, except that the unit may be operated at higher temperature than such prior art units.

I claim:

1. A viscous shear coupling comprising an annular driving member, a driven member having an internal annular chamber receiving said annular driving member, said driven member being axially and radially located for rotation relative to said driving member, facial planar and circumferential surfaces of said chamber and opposing facial planar and circumferential surfaces of said driving member at least in part being in close-spaced relationship, viscous coupling fluid in said chamber, and a 0.0005 to 0.0015 inch thick layer of non-metallic anti-friction material on at least those parts of said facial planar and circumferential surfaces of said annular chamber which are in close spaced relationship, said non-metallic anti-friction material forming journal and thrust bearing means for the relative rotation of the driving member and the driven member.

2. A coupling according to claim 1, wherein the driving member is made of metal and the driven member is made of a metal which is heat dissipating and lighter than the metal of the driving member.

3. A coupling according to claim 2, wherein the driving member is made of cast iron and the driven member is made of aluminium.

4. A coupling according to claim 3, wherein the driven member is die-cast.

5. A coupling according to claim 1, wherein the non-metallic material is selected from the group consisting of polytetrafluoroethylene and polytetrafluoroethylene with another synthetic resin that gives improved adhesion and which can be cured in situ at temperatures lower than the sintering temperature of pure polytetrafluoroethylene.

6. A coupling according to claim 1, wherein a 0.0005 to 0.0015 inch thick layer of non-metallic anti-friction material is present on facial planar and/or circumferential surfaces of the driving member.

7. A coupling according to claim 6, wherein the non-metallic material is selected from the group consisting of polytetrafluoroethylene and polytetrafluoroethylene with another synthetic resin that gives improved adhesion and which can be cured in situ at temperatures lower than the sintering temperature of pure polytetrafluoroethylene.

8. A coupling according to claim 1, wherein fan spider arms extend from and are integral with the driven member.

9. A coupling as claimed in claim 8 wherein aluminium fan blades are attached directly to the fan spider arms with a substantial area of contact between the fan blades and fan spider arms.

* * * * *